United States Patent [19]

Kawakubo et al.

[11] Patent Number: 4,618,656

[45] Date of Patent: Oct. 21, 1986

[54] NOVEL POLYMER AND CURED PRODUCT OF THE SAME

[75] Inventors: Fumio Kawakubo; Miyako Takanoo; Sadao Yukimoto; Katsuhiko Isayama, all of Kobe, Japan

[73] Assignee: Kanegafuchi Chemical Industry Co., Ltd., Japan

[21] Appl. No.: 727,295

[22] Filed: Apr. 25, 1985

[30] Foreign Application Priority Data

Apr. 26, 1984 [JP] Japan ................................. 59-84848

[51] Int. Cl.⁴ ...................... C08L 71/02; C08F 283/06
[52] U.S. Cl. .................................. 525/404; 525/254; 525/403; 525/445; 525/446; 525/479; 525/529
[58] Field of Search ............... 525/404, 479, 403, 254, 525/529

[56] References Cited

U.S. PATENT DOCUMENTS

| | | | |
|---|---|---|---|
| 3,632,399 | 1/1972 | Burlant et al. | 525/445 |
| 3,990,459 | 11/1976 | Papantoniou | 525/404 |
| 4,032,599 | 6/1977 | Cordrey et al. | 525/404 |
| 4,302,571 | 11/1981 | Arai et al. | 525/404 |
| 4,368,290 | 1/1983 | Alberts et al. | 525/404 |
| 4,543,390 | 9/1985 | Tanaka et al. | 525/404 |
| 4,568,705 | 2/1986 | Grace et al. | 525/404 |

FOREIGN PATENT DOCUMENTS 0063492  6/1978  Japan ................................. 525/254

Primary Examiner—Wilbert J. Briggs, Sr.
Attorney, Agent, or Firm—Wegner & Bretschneider

[57] ABSTRACT

A polymer which is prepared by polymerizing at least one ethylenically unsaturated monomer in the presence of an organic polymer having at least one reactive silicone group in a molecule and a compound having at least two independent ethylenically unsaturated functional groups in a molecule by use of a radical polymerization initiator having a reactive silicone group and/or a chain transfer agent having a reactive silicone group, which is cured with moisture to give a product having improved properties such as tensile properties and weather resistance.

13 Claims, No Drawings

NOVEL POLYMER AND CURED PRODUCT OF THE SAME

FIELD OF THE INVENTION

The present invention relates to a novel polymer and a cured product of the same. More particularly, it relates to a novel polymer which is cured with moisture to give an elastomeric or resinous material with improved tensile strength.

BACKGROUND OF THE INVENTION

Japanese Patent Kokai Publication (unexamined) No. 78223/1984 discloses a novel polymer prepared by polymerizing an ethylenically unsaturated compound in the presence of an organic polymer having at least one reactive silicone group in a molecule. This polymer has superior properties to those of the organic polymer having at least one reactive silicone group in a molecule. Particularly, the polymer the backbone of which is polyether has significantly improved weather resistance. However, the tensile properties of the cured material of the polymer are not satisfactorily improved. For example, elongation at break of the cured polymer is inferior to that of the organic polymer having at least one reactive silicone group in a molecule. Inferior elongation restricts application fields of the polymer and, for example, it cannot be practically used as a sealing material, which is one of important application fields of the organic polymer having at least one reactive silicone group in a molecule.

SUMMARY OF THE INVENTION

One object of the present invention is to provide a novel polymer which is cured with water or moisture to give an elastomeric or resinous material with improved tensile properties, particularly elongation at break.

Another object of the present invention is to provide a novel polymer prepared by polymerizing a ethylenically unsaturated monomer in the presence of an organic polymer having at least one reactive silicone group in a molecule.

Further object of the present invention is to provide a curing composition comprising the novel polymer of the invention and a cured product thereof.

DETAILED DESCRIPTION OF THE INVENTION

According to the present invention, there is provided a polymer which is prepared by polymerizing at least one ethylenically unsaturated monomer in the presence of an organic polymer having at least one reactive silicone group in a molecule and a compound having at least two independent ethylenically unsaturated functional groups in a molecule by use of a radical polymerization initiator having a reactive silicone group and/or a chain transfer agent having a reactive silicone group.

The organic polymer having at least one reactive silicone group in a molecule is prepared by one of methods described in following Japanese Patent Publications:

Japanese Patent Publication Nos. 36319/1970, 12154/1971 and 32673/1974 and Japanese Patent Kokai Publication (unexamined) Nos. 156599/1975, 73561/1976, 6096/1979, 13767/1980, 13768/1980, 82123/1980, 123620/1980, 125121/1980, 131021/1980, 131022/1980, 135135/1980, 137129/1980, etc. Preferred examples of the organic polymer used in the present invention are those having a backbone chain consisting of a polyalkyleneoxide, a polyester and an ether-ester block copolymer and a molecular weight of 500 to 30,000. Most preferred is the organic polymer having a backbone chain of a polyalkyleneoxide and a molecular weight of 3,000 to 15,000 in which the reactive silicone group is bonded to at least one terminal carbon atom of the molecule.

The reactive silicone group used herein is intended to mean a group which effects a condensation reaction in the presence of moisture or a cross linking agent and optionally a catalyst. Examples of such group are a group containing silicone atom which bonds to a hydrolyzable group, a silanol group and preferably a group of the formula:

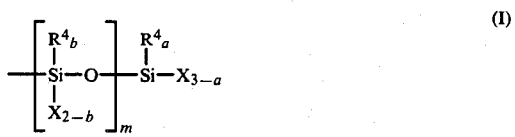

wherein $R^4$ is a $C_1$-$C_{20}$ alkyl, a $C_6$-$C_{20}$ aryl, a $C_7$-$C_{20}$ aralkyl group or a triorganosiloxane group of the formula:

$$(R'')_3SiO-\qquad\qquad(VI)$$

wherein $R''$ is, the same or different, $C_1$-$C_{20}$ hydrocarbon group, X is a hydroxyl group or, the same or different, a hydrolyzable group, a is 0, 1, 2 or 3, b is 0, 1 or 2, and m is an integer of 0 to 18. The hydrolyzable group X is, for example, a halogen atom, a hydride group, an alkoxy group, an acyloxy group, a ketoximate group, a mercapto group, an alkenyloxy group, etc. The reactive silicone group is preferably linked to the organic polymer through a Si—C linkage.

The organic polymer having the reactive silicone group may be prepared, for example, by reacting, according to a so-called hydrosilylation reaction, a hydrogenated silicone compound of the formula:

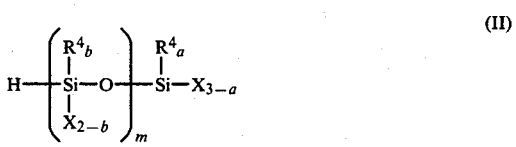

wherein $R^4$, X, a, b and m are the same as defined above and a polyalkyleneoxide having an ethylenically unsaturated group of the formula:

wherein Z is a divalent $C_1$-$C_{40}$, preferably $C_1$-$C_{20}$ organic group, preferably —R—, —ROR—, —ROCO—, —RNHCO—, —RCO— and —CO— in which R is each $C_1$-$C_{20}$ hydrocarbon group, particularly a methylene group, R' is a hydrogen atom or the substituted or unsubstituted $C_1$-$C_{20}$ organic group, preferably a hydrogen atom or a hydrocarbon group, particularly, a hydrogen atom, and c is 0 or 1 in the presence of a platinum catalyst (e.g. chloroplatinic acid, etc.)

Other examples of methods for preparing the organic polymer having the reactive silicone group are as follows:

(1) Polyisocyanate compound such as toluenediisocyanate is reacted with polyalkyleneoxide having terminal hydroxyl groups to produce polyalkyleneoxide having terminal isocyanate groups, which are subsequently reacted with an active hydrogen-containing group W of a silicone compound of the formula:

$$W-R-\underset{\underset{X_{3-b}}{|}}{\overset{R^4_b}{\overset{|}{Si}}}-X_{3-b} \quad \text{(IV)}$$

wherein W is an active hydrogen-containing group selected from the group consisting of a hydroxyl group, a carboxyl group, a mercapto group and a primary or secondary amino group, and $R^4$, R, X and b are the same as defined above.

(2) The ethylenically unsaturated group (III) of the polyalkyleneoxide is reacted with the mercapto group of the silicone compound (IV) wherein W is the mercapto group.

(3) The terminal hydroxyl group of the polyalkyleneoxide is reacted with a compound of the formula:

$$OCN-R-\overset{R^4_b}{\underset{|}{Si}}-X_{3-b} \quad \text{(V)}$$

wherein $R^4$, R, X and b are the same as defined above. The present invention is not limited to the above methods.

Each $R^4$ in the hydrogenated silicone compound (II) is, the same or different, a monovalent $C_1$-$C_{20}$ hydrocarbon group, and its specific examples are an alkyl group (e.g. methyl, ethyl, etc.), a cycloalkyl group (e.g. cyclohexyl, etc.), an aryl group (e.g. phenyl, etc.) and an aralkyl group (e.g. benzyl, etc.). $R^4$ may stand for the triorganosiloxane group (VI).

Specific examples of the hydrogenated silicone compound (II) are halogenated silanes (e.g. trichlorosilane, methyldichlorosilane, dimethylchlorosilane, trimethylsiloxydichlorosilane, etc.), alkoxysilanes (e.g. trimethoxysilane, triethoxysilane, methyldimethoxysilane, methyldiethoxysilane, phenyldimethoxysilane, 1,3,3,5,5,7,7-heptamethyl-1,1-dimethoxytetrasiloxane, etc.), acyloxysilanes (e.g. methyldiacetoxysilane, trimethylsiloxmethylacetoxysilane, etc.), ketoximatesilanes (e.g. bis(dimethylketoximate)methylsilane, bis(cyclohexylketoximate)methylsilane, bis(diethylketoximate)trimethylsiloxysilane, etc.), hydrosilanes (e.g. dimethylsilane, trimethylsiloxymethylsilane, 1,1-dimethyl-2,2-dimethyldisiloxane, etc.), and alkenyloxysilanes (e.g. methyldi(isopropenyloxy)silane, etc.).

In the reaction of the hydrogenated silicone compound (II) and the polyalkyleneoxide (III), a part or all of X groups may be converted to other hydrolyzable group(s) or a hydroxyl group(s). For example, when X is halogen atom or the hydride group, it is preferably converted to an alkoxy group, an acyloxy group, an aminoxy group, an alkenyloxy group, a hydroxyl group, etc.

The polyalkyleneoxide having the group (III) may be prepared by a method disclosed in Japanese Patent Kokai Publication (unexamined) No. 6097/1979 or a method comprising introducing the ethylenically unsaturated group by copolymerizing an epoxy compound (e.g. ethyleneoxide, propyleneoxide, etc.) with an epoxy compound having an ethylenically unsaturated group (e.g. allyl glycidyl ether, etc.).

Preferably, the main chain of the polyalkyleneoxide to be used in the invention comprises repeating units of the formula:

$$-R^1-O- \quad \text{(VII)}$$

wherein $R^1$ is a $C_1$-$C_8$ divalent organic group, preferably most of $R^1$ are $C_1$-$C_4$ hydrocarbon groups. Specific examples of $R^1$ are $-CH_2-$, $-CH_2CH_2-$, $-CH(CH_3)CH_2$, $-CH(C_2H_5)CH_2-$, $-C(CH_3)_2CH_2-$, $-CH_2CH_2CH_2CH_2-$, etc. The main chain of the polyalkyleneoxide may comprise one or more kinds of the repeating units. Among them, $-CH(CH_3)CH_2-$ is most preferred. The molecular weight of the polyalkyleneoxide is preferably from 500 to 30,000, more preferably from 3,000 to 15,000.

The organic polymer having the reactive silicone group may be used alone or a mixture of two or more kinds of the polymers. In addition, a mixture containing 50% by weight or more of the polymer may be used. The amount of the organic polymer having the reactive silicone group is preferably from 10 to 1,000 parts by weight, especially from 30 to 300 parts by weight based on 100 parts by weight of the ethylenically unsaturated monomer.

The ethylenically unsaturated monomer to be used in the invention is one or more monomers selected from the groups consisting of an ethylenically unsaturated compound of the formula:

$$CH_2=C\begin{matrix}R^2\\ \diagdown\\ R^3\end{matrix} \quad \text{(VIII)}$$

wherein $R^2$ is a hydrogen atom, a halogen atom or a substituted or unsubstituted monovalent $C_1$-$C_{10}$ hydrocarbon group, and $R^3$ is a hydrogen atom, a halogen atom, a substituted or unsubstituted monovalent $C_1$-$C_{10}$ hydrocarbon group, a substituted or unsubstituted monovalent aromatic group, an alkenyl group, a carboxyl group, an acyloxy group, an alkoxycarbonyl group, a nitrile group, a pyridyl group, an amide group or a glycidoxy group, and an ethylenically unsaturated compound of the formula:

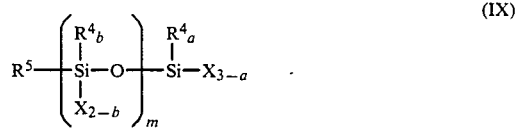
$$R^5 - \left(\begin{matrix}R^4_b\\|\\ Si-O\\|\\X_{2-b}\end{matrix}\right)_m \overset{R^4_a}{\underset{|}{Si}}-X_{3-a} \quad \text{(IX)}$$

wherein $R^4$, X, a, b and m are the same as defined above and $R^5$ is an organic group having a ethylenically unsaturated group.

Specific examples of the ethylenically unsaturated compound (VIII) are ethylene, propylene, isoprene, butadiene, chloroprene, vinyl chloride, vinylidene chloride, acrylic acid, methacrylic acid, vinyl acetate, acrylonitrile, pyridine, styrene, chlorostyrene, 2-methylstyrene, methyl acrylate, ethyl acrylate, isobutyl acrylate, 2-ethylhexyl acrylate, 2-hydroxyethyl acrylate, benzyl acrylate, glycidyl acrylate, methyl methacrylate, ethyl methacrylate, isobutyl methacrylate, 2-ethylhexyl methacrylate, 2-hydroxyethyl methacrylate, benzyl methacrylate, glycidyl methacrylate, acrylamide, methacrylamide, n-methylolacrylamide, etc.

Among these monomers, an acrylate or methacrylate monomer of the formula:

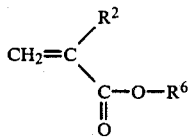
(X)

wherein $R^2$ is the same as defined above and $R^6$ is a substituted or unsubstituted $C_1$–$C_{20}$ monovalent aliphatic or aromatic group is preferred. Preferably, $R^2$ is a hydrogen atom or a methyl group, and a substituted or unsubstituted monovalent hydrocarbon group of $R^6$ is methyl, ethyl, propyl, n-butyl, isobutyl, 1-ethylpropyl, 1-methylpentyl, 2-methylpentyl, 3-methylpentyl, 1-ethylbutyl, 2-ethylbutyl, isooctyl, 3,5,5-trimethylhexyl, 2-ethylhexyl, decyl, dodecyl, 2-hydroxyethyl, 2-hydroxypropyl, diaminoethyl, diethylaminoethyl, glycidyl, tetrahydrofurfuryl, benzyl, etc., and preferably n-butyl and 2-ethylhexyl. A monomeric mixture containing at least 50% by weight of the above acrylate or methacrylate monomer is preferred.

Specific examples of the ethylenically unsaturated compound (IX) are as follows:

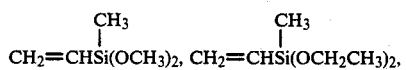

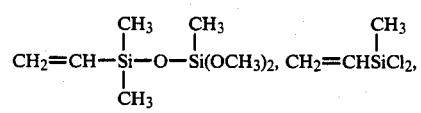

$CH_2{=}CHSi(OCH_3)_3, CH_2{=}CHSi(OCH_2CH_3)_3, CH_2{=}CHSiCl_3,$

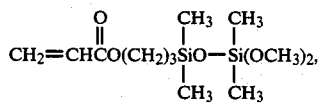

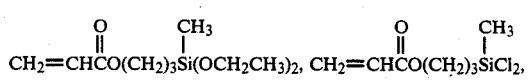

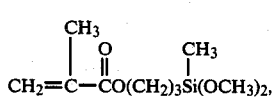

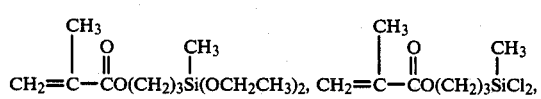

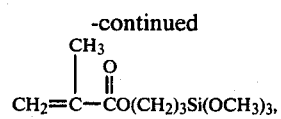

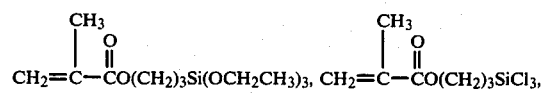

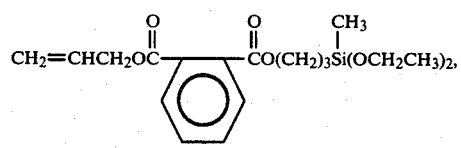

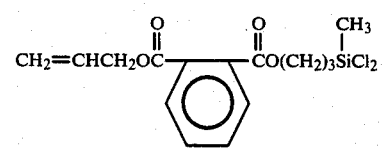

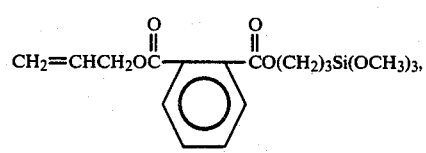

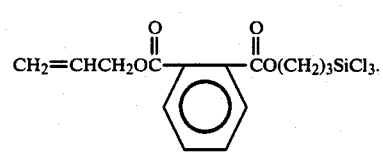

Among them,

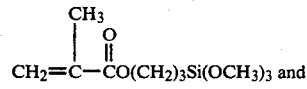 and

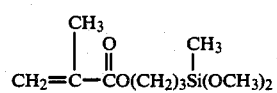

are more preferred.

The compound having at least two independent ethylenically unsaturated groups in a molecule may have unsaturated groups of the formula:

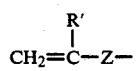

wherein Z and R' are the same as defined above.

Examples of the compound having at least two independent ethylenically unsaturated functional groups in a molecule (hereinafter referred to as "polyfunctional monomer") used in the invention are acrylate or methacrylate of polyol and other polyvinyl compounds. Specific examples are neopentylglycol diacrylate and dimethacrylate, 1,5-pentanediol diacrylate and dimethacrylate, 1,6-hexanediaol diacrylate and dimethacrylate, polyethyleneglycol diacrylate and dimethacrylate, polypropyleneglycol diacrylate and dimethacrylate, divinylbenzene, silicone compounds having at least two ethylenically unsaturated groups in the molecule which may be used as starting materials of so-called addition type silicones, such as

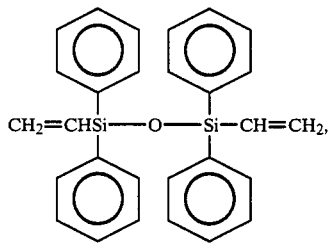

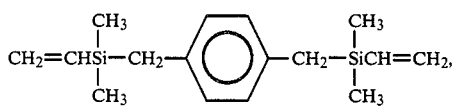

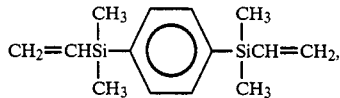

a methacrylate ester of polybutadiene having terminal hydroxyl groups (e.g. NISSO-PB (trade name) TE2000 manufactured by Nippon Soda), a reaction product of polyfunctional epoxy compound with an equimolar amount of acrylic or methacrylic acid such as

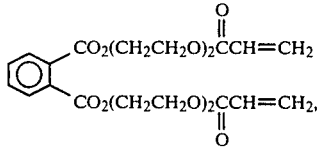

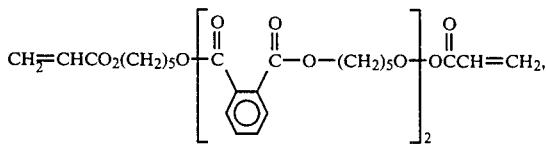

a reaction product of polyurethane having terminal hydroxyl groups with acrylic or methacrylic acid in an equimolar amount with the terminal hydroxyl groups, diallyl o-phthalate and isophthalate, allyl acrylate and methacrylate, methylenebisacrylamide,

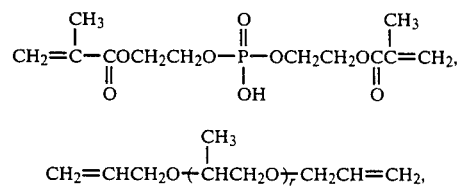

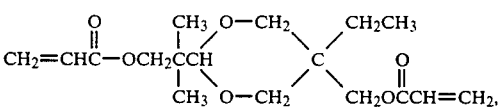

(cf. Japanese Patent Kokai Publication Nos. 13496/1975, 149797/1975, 136583/1978 and 13768/1980), trimethylolpropane triacrylate and methacrylate, pentaerythritol acrylate and methacrylate, triacrylate and trimethacrylate of tris(2-hydroxyethyl-

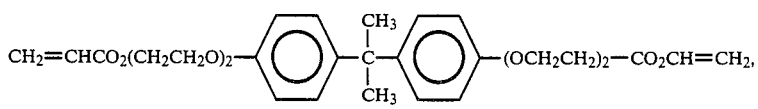

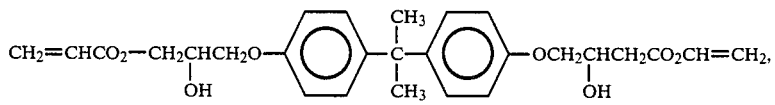

a reaction product of polyester having a terminal hydroxyl group with an equimolar amount of acrylic or methacrylic acid such as )isocyanuric acid, trially cyanurate, tetramethylolmethane tetraacrylate and tetramethacrylate,

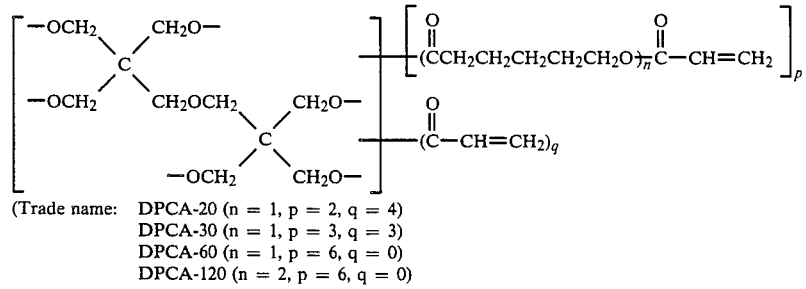

(Trade name: DPCA-20 (n = 1, p = 2, q = 4)
DPCA-30 (n = 1, p = 3, q = 3)
DPCA-60 (n = 1, p = 6, q = 0)
DPCA-120 (n = 2, p = 6, q = 0)

manufactured by Nippon Kayaku), diallyl phthalate polymer (e.g. Daisodap L (trade name) manufactured by Osaka Soda), polybutadiene-1,2 (NISSO-PB (trade name) manufactured by Nippon Soda), etc.

The polyfunctional monomer may be used alone or as a mixture of two or more kinds of the compounds. The amount of the polyfunctional monomer is preferably from 0.5 to 50 parts by weight, more preferably from 1 to 10 parts by weight based on 100 parts by weight of the ethylenically unsaturated monomer. When the polyfunctional monomer is used in an amount of less than 0.5 parts by weight, the property, such as tensile strength of the cured polymer is not improved. When the polyfunctional monomer is used in a too large amount, the polymer tends to be gelled depending on the amounts of the chain transfer agent and the radical initiator and/or the presence of the solvent.

Preferred radical polymerization initiator having a reactive silicaone group is an azo compound or a peroxide having a reactive silicone group of the formula:

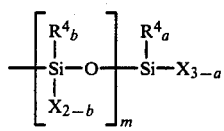
(I)

wherein $R^4$, X, a, b and m are the same as defined above. The azo type initiator may be represented by the formula:

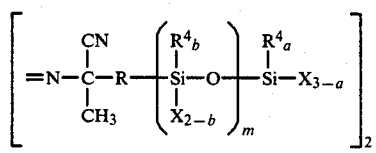
(XI)

wherein $R^4$, R, X, a, b and m are the same as defined above, preferably X is an alkoxy group such as a methoxy group and an ethoxy group. Preferred examples of the azo compound are as follows:

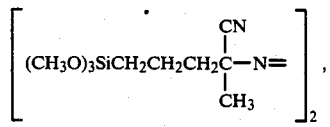

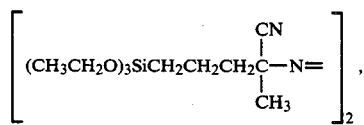

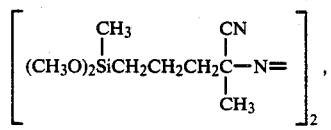

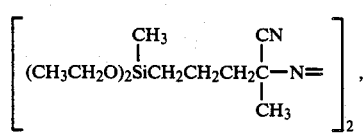

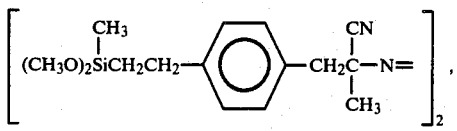

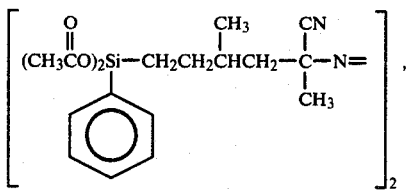

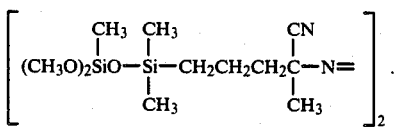

Specific examples of the peroxide type radical initiator are as follows:

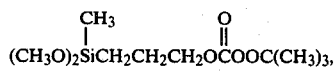

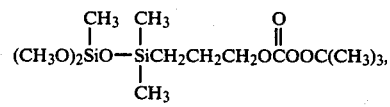

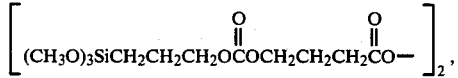

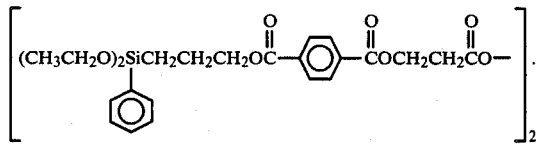

The amount of the radical polymerization initiator having a reactive silicone group is preferably from 0.01 to 20 parts by weight, more preferably from 0.5 to 10 parts by weight based on 100 parts by weight of the ethylenically unsaturated monomer.

Preferred chain transfer agent having a reactive silicone group has a reactive silicone group (I) and may be represented by the formulas:

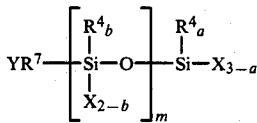
(XII)

and

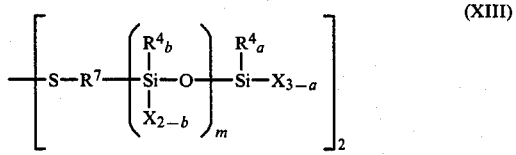
(XIII)

wherein $R^4$, X, a, b and m are the same as defined above, and $R^7$ is a $C_1$-$C_{20}$ divalent saturated hydrocarbon group and Y is a group which imparts a chain transfer constant larger than $10^{-3}$ to the compound (XII) and is to be activated by a free radical. Y may be a mercapto group, bromine atom or an amino group, and preferably a mercapto group. Specific examples of the chain transfer agent are as follows:

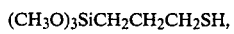

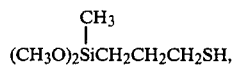

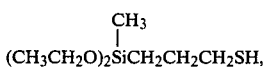

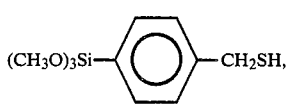

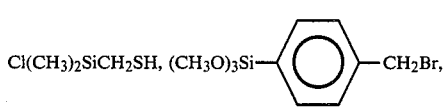

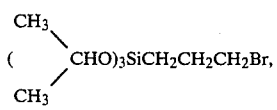

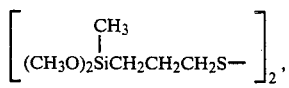

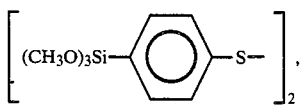

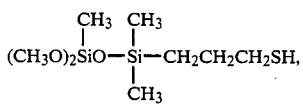

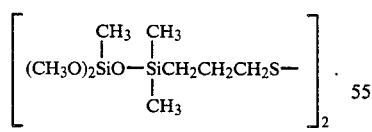

The amount of the chain transfer agent having the reactive silicone group is preferably from 0.01 to 20 parts by weight based, more preferably from 0.5 to 10 parts by weight on 100 parts by weight of the ethylenically unsaturated monomer.

The polymerization according to the present invention can be carried out in a conventional manner. For example, the polymerization may be initiated by a radical initiator other than the above described radical initiator having the reactive silicone group, or by irradiation with ultraviolet, X-ray or gamma-ray. Examples of other radical initiator are peroxides (e.g. benzoyl peroxide, benzoyl hydroperoxide, di-t-butyl peroxide, di-t-butyl hydroperoxide, acetyl peroxide, lauroyl peroxide, hydrogen peroxide, etc.), azo compounds (e.g. azobisisobutyronitrile, etc.) and peroxide compounds (e.g. persulfuric acid, diisopropyl peroxydicarbonate, etc.).

The polymerization may be carried out in a solvent which is preferably inactive with the ethylenically unsaturated monomer as well as the organic polymer having the reactive silicone group. Specific examples of the solvent are ethers (e.g. diethyl ether, methyl ethyl ether, methylcellosolve, etc.), hydrocarbons (e.g. pentane, hexane, heptane, etc.), acetates (e.g. methyl acetate, ethyl acetate, butyl acetate, etc.), etc.

The polymerization temperature is not critical in the invention. When the polymerization is initiated by the initiator, it depends on the kind of the initiator, and preferably from 50° to 150° C.

In addition to the chain transfer agent having the active silicone group, other chain transfer agent such as thiol compounds (e.g. 1-butanethiol, 1-hexanethiol, 1-dodecanethiol, etc.), disulfide compounds (e.g. ethyldisulfide, phenyldisulfide, butyldisulfide, etc.), halogenated compounds (e.g. chloroform, carbon tetrachloride, carbon tetrabromide, etc.), amine compounds (e.g. triethylamine, tripropylamine, tributylamine, etc.), lower alcohols (e.g. ethanol, isopropanol, butano., etc.) may be used to control the polymerization degree. The ethylenically unsaturated monomer may be added in one portion, or portionwise or continuously to the polymerization system to control reaction heat.

A reason why the properties, particularly tensile strength of the polymer are improved by the present invention so that the polymer has low modulus and large elongation may be explained as follows:

The reactive silicone functional group is always present at one end of the polymer of the ethylenically unsaturated monomer which is generated by the radical initiator having the reactive silicone groups or the chain transfer agent having the reactive silicone group which is activated by the free radical. When the polyfunctional monomer is present, a polymer having the reactive silicone group at one end is bonded to the group generated on side chains of the polymer. For example, when n-butyl acrylate (hereinafter referred to as "BA") is polymerized in the presence of the neopentylglycol diacrylate as the polyfunctional monomer by the use of -mercaptopropyltrimethoxysilane as the chain transfer agent having the reactive silicone group, the polymer structure may be schematically represented as follows:

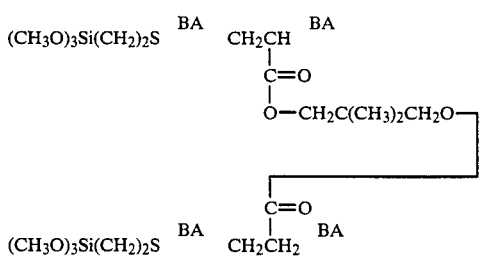

According to the conventional radical polymerization, it is difficult to quantitatively prepare a polymer having the above structure, but only a mixture of one having such structure that the polyfunctional monomer is not introduced in a molecule but only at one end of the molecule, one having such structure that the polyfunctional monomer is polymerized but one of the ends does not have any reactive silicone functional group, and/or one having such structure that neither end has any reactive silicone functional group. In the polymerization of the present invention, the reaction may be influenced by the presence of the organic polymer having the reactive silicone group and the monomer may be grafted on the polymer to give a more complicate structure.

However, the polymer of the present invention comprises the molecules having a quasi-telechelic structure and the cured product of the polymer has comparatively large molecular weight between the cross-linked sites so that it has low modulus and large elongation.

The polymer of the present invention is used as an adhesive, a pressure sensitive adhesive, a coating material, a sealing material, a water-proof material, a spray covering material, a templating material, a casting material, etc., and particularly useful as the sealing material and the pressure sensitive adhesive. Especially, the polymer of the present invention prepared by using an acrylate or methacrylate monomer as the ethylenically unsaturated monomer are useful as the sealing material and the pressure sensitive adhesive. When the polymer is used in the above applications, a conventionally used additive is optionally added. Examples of the additive are a reinforcement or non-reinforcement filler (e.g. white carbon, carbon black, calcium carbonate, titanium oxide, talc, asbestos, glass fiber, etc.), a plasticizer, an anti-oxidant, an ultraviolet light absorber, a pigment, a flame retardant, etc.

When the polymer of the invention is used as the sealing material, optionally added is a plasticizer, a filler, a reinforcement, a thickening agent, a colorant, an anti-aging agent, an adhesion promoting agent, a property modifier, etc. Specific examples of the plasticizer are phthalates (e.g. dibutyl phthalate, diheptyl phthalate, di(2-ethylhexyl) phthalate, butyl benzyl diphthalate, butyl phthalyl butylglycolate, etc.), non-aromatic dibasic acid esters (e.g. dioctyl adipate, dioctyl sebacate, etc.), esters of polyalkylene glycol (e.g. diethylene glycol dibenzoate, triethylene glycol dibenzoate, etc.), phosphates (e.g. tricresyl phosphate, tributyl phosphate, etc.), chlorinated paraffins, hydrocarbon oils (e.g. alkyldiphenyl, partially hydrogenated terphenyl, etc.), which are used alone or as a mixture thereof. The plasticizer may be added in the course of the polymerization. Specific examples of the filler or reinforcement are heavy or light calcium carbonate, calcium carbonate surface of which is treated with an aliphatic acid, a resin acid, a cationinc surfactant, an anionic surfactant, etc., magnesium carbonate, talc, titanium oxide, barium sulfate, alumina, metal powder (e.g. aluminium, zinc and iron powder), bentonite, kaolin clay, fumed silica, silica powder, and carbon black. When a transparent filler or reinforcement such as fumed silica is used, a transparent sealing material is prepared. Specific examples of the thickening agent are hydrogenated caster oil, and metal soap such as calcium stearate, aluminium stearate and barium stearate. The thickening agent may not be used depending on the end use of the compounding of the filler or reinforcement. As the colorant, conventional organic or inorganic pigment or dye may be used. Specific examples of the property modifier are silicone compounds such as alkylalkoxy silanes (e.g. methyltrimethoxysilane, dimethyldimethoxysilane, trimethylmethoxysilane, a n-propyltrimethoxysilane, etc.), alkylisopropenoxysilanes (e.g. dimethyldiisopropenoxysilane, methyltriisopropenoxysilane, γ-glycidoxypropylmethyldiisopropenoxysilane, etc.), alkoxysilane having a functional group(s) (e.g. γ-glycidoxypropylmethyldimethoxysilane, γ-glycidoxypropyltrimethoxysilane, vinyltrimethoxysilane, vinyldimethylmethoxysilane, γ-aminopropyltrimethoxysilane, N-(β-aminoethyl)aminopropylmethyldimethoxysilane, γ-mercaptopropyltrimethoxysilane, γ-mercaptopropyldimethoxysilane, etc.), silicone varnish, polysiloxanes, etc. Addition of the property modifier can increase or decrease the hardness of the cured polymer. The adhesivity promoting agent is not necessarily added since the polymer of the invention per se has adhesivity to surface of glass, ceramics, metals etc., or the polymer can be adhered to various surfaces by the use of a primer. Specific examples of the adhesivity promoting agent are epoxy resins, phenol resins, silane coupling agents, alkyl titanates, aromatic polyisocyanate, etc. Specific examples of the curing catalyst are titanates (e.g. tetrabutyl titanate, teterapropyl titanate, etc.), organic tin compounds (e.g. dibutyltin dilaurate, dibutyltin maleate, dibutyltin diacetate, tin caprilate, tin naphthenate, etc.), lead caprilate, amine compounds (e.g. butylamine, octylamine, dibutylamine, monoethanolamine, diethanolamine, triethanolamine, diethylenetriamine, triethylenetetramine, oleylamine, octylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, 1,3-diazabicyclo[5.4.6]undecene-7 (DBU), and their salts with carboxylic acids, etc.), a low molecular weight polyamide prepared from a polybasic acid and an excess amount of polyamine, a reaction product of an epoxy compound and an excess amount of polyamine, a silanol condensation catalyst such as a silane coupling agent having an amino group (e.g. γ-aminopropyltrimethoxysilane, N-(β-aminoethyl)aminopropylmethyldimethoxysilane, etc), and a mixture thereof.

To improve processability of the polymer and/or to reduce the viscosity of the polymer, a solvent may be used. Specific examples of the solvent are aromatic hydrocarbons (e.g. toluene, xylene, etc.), esters (e.g. ethyl acetate, butyl acetate, amyl acetate, cellosolve acetate, etc.), and ketones (e.g. methyl ethyl kotone, methyl isobutyl ketone, diisobutyl ketone, etc.). The solvent may be used in the polymerization step.

The anti-ageing agent is not necessarily added to the polymer. When used, the antioxidant or the ultraviolet absorbing agent is preferably used.

The sealing material comprising the polymer of the invention may be formulated as a moisture curing one-pack type one by compounding all the components and stored in a sealed state. Alternatively, the sealing material may be formulated as a two-pack type one consisting of the polymer composition and a curing mixture containing the curing catalyst, the filler, the plasticizer, water and other suitable components except the polymer, which are mixed in use.

In case of the one-pack type sealing material, since all the components are beforehand compounded, preferably, any component including water or moisture should be dehydrated before compounding, or the components are compounded with removing water or moisture, for example, under reduced pressure.

In case of the two-pack type one, since the polymer composition does not contain any curing catalyst, either the polymer composition and the curing mixture may contain a slight amount of water or moisture. However, for longer storage of the sealing material, it is preferably dehydrated. Solid components such as powder may be heated to dehydrate, and liquid components may be dehydrated under reduced pressure or with a desiccant such as synthetic zeolites, active alumina and silica gel. Alternatively or in addition, water or moiture can be removed by adding a small amount of isocyanate compound to react the isocyante groups with water or moisture. In addition, storage stability of the sealing material is improved by the addition of lower alcohols (e.g. methoanol, ethanol, etc.) or alkoxysilane (e.g. n-propyltrimethoxysilane, vinylmethyldimethoxysilane, γ-mercaptopropylmethyldimethoxysilane, γ-glycidoxypropyltrimethoxysilane, etc.).

Whe the polymer of the invention is to be used as the pressure sensitive adhesive, the same curing catalyst, the anti-ageing agent, the plasticizer, the reinforcement, the property modifier, the solvent, etc. as used in the sealing material may be used. For certain some final uses, the pressure sensitive adhesive may contain a conventionally used additive such as rosin ester resin, phenol resin, xylene resin, xylene-phenol resin, cumarone resin, petroleum resin including aromatic, resin-/aromatic copolymer and alicyclic one, terpene resin, terpene-phenol resin, low molecular weight polystyrene, etc. The pressure sensitive adhesive according to the present invention may be used in the same way as the conventional pressure sensitive adhesive and is applied on a substrate such as tape, a sheet, a label and a foil. For example, the pressure sensitive adhesive according to the present invention as such or in the form of a solution, an emulsion or a hot-melt type may be applied on a film of a synthetic resin or a modified natural material, paper, fabrics, metal foils, metallized plastic foils, asbestos or glass fiber fabrics and cured at a room temperature or an elevated temperature with exposure to water or moisture.

The invention will be hereinafter explained further in detail by following Examples.

COMPARATIVE EXAMPLE 1

To a reactor, a propyleneoxide polymer having terminal groups 80% of which are $(CH_3O)_2$-$Si(CH_3)CH_2CH_2CH_2O$— (100 g. Average molecular weight, 8,200) was charged and evacuated under reduced pressure. After replacing the interior of the reactor with nitrogen, the temperature was raised to 90° C. with stirring. Then, a monomeric mixture of n-butyl acrylate (92.2 g), γ-methacryloxypropyldimethoxysilane (2.8 g) and 2,2'-azobisisobutyronitrile (hereinafter referred to as "AIBN") (5.0 g) was dropwise added in a nitrogen atmosphere over 2 hours. AIBN (each 0.25 g) dissolved in 4 time weight acetone was added after 15 and 30 minutes from the completion of the addition of the mixture. Thereafter, the reaction was continued for further 30 minutes with stirring to obtain a slightly opaque pale yellow viscous liquid polymer with viscosity of 380 poise (23° C.). Gas chromatographic analysis (hereinafter referred to as "GC analysis") revealed that the amount of the residual monomer was 0.5%.

COMPARATIVE EXAMPLE 2

To a reactor, the same propyleneoxide polymer having reactive silicone terminal groups as used in Comparative Example 1 (100 g) was charged and evacuated under reduced pressure. After replacing the interior of the reactor with nitrogen, the temperature was raised to 90° C. with stirring. Then, a monomeric mixture of n-butyl acrylate (94.5 g), γ-mercaptopropyltrimethoxysilane (1.0 g) and AIBN (0.5 g) was dropwise added to the reactor in a nitrogen atmosphere over 2 hours. AIBN (each 0.025 g) dissolved in 4 time weight acetone was added after 15 and 30 minutes from the completion of the addition of the mixture. Thereafter, the reaction was continued for further 30 minutes with stirring to obtain a transparent pale yellow viscous liquid polymer with viscosity of 1,920 poise (23° C.). GC analysis revealed that the amount of the residual monomer was 0.4%.

COMPARATIVE EXAMPLE 3

In the same manner as in Comparative Example 2 but using, as a monomeric mixture, a mixture of n-butyl acrylate (96.9 g), γ-methacryloxypropyldimethoxysilane (0.3 g), γ-mercaptopropyldimethoxysilane (1.6 g) and AIBN (0.5 g), the reaction was carried out to obtain a transparent pale yellow viscous liquid polymer with viscosity of 490 poise (23° C.). GC analysis revealed that the amount of the residual monomer was 0.7%.

EXAMPLE 1

In the same manner as in Comparative Example 2 but using, as a monomeric mixture, a mixture of n-butyl acrylate (93.9 g), γ-mercaptopropyldimethoxysilane (3.5 g), neopentylglycol diacrylate (2.1 g) and AIBN (0.5 g), the reaction was carried out to obtain a transparent pale yellow viscous liquid polymer with viscosity of 260 poise (23° C.). GC analysis revealed that the amount of the residual monomer was 0.5%.

To the polymer produced in Example 1 and Comparative Example 1, 2 and 3 (100 g), glue type calcium carbonate treated with a fatty acid (120 g), titanium oxide (30 g), dioctyl phthalate (60 g), hydrogenated caster oil (6 g), styrenated phenol (1 g) and a benzotriazol type ultoraviolet light absorbing agent (1 g) were added and kneaded by passing the mixture through three roll paint rolls. Then, the kneaded mixture was thoroughly mixed with a curing mixture of tin caprylate (3 g) and laurylamine (1 g).

According to JIS (Japanese Industrial Standards) A-5758, a II type test piece with an H shape was produced and examined for its tensile strength. The results are shown in Table 1.

TABLE 1

| Polymer | Example 1 | Comparative Example 1 | Comparative Example 2 | Comparative Example 3 |
|---|---|---|---|---|
| $M_{50}$(*1) (kg/cm$^2$) | 1.4 | 1.6 | 1.2 | 1.7 |
| $M_{100}$(*2) (kg/cm$^2$) | 2.8 | 3.7 | 2.6 | 3.4 |
| $T_B$(*3) (kg/cm$^2$) | 5.8 | 3.9 | 4.6 | 5.2 |
| $E_B$(*4) (%) | 530 | 180 | 320 | 310 |
| Failure | Cohesive failure | | | |

Note
(*1)Modulus at 50% elongation.
(*2)Modulus at 100% elongation.
(*3)Strength at break.
(*4)Elongation at break.

As is seen from the results of Table 1, the polymer of the invention as produced in Example 1 in which, as a polyfunctional acrylic monomer, neopentylglycol diacrylate was used had better tensile properties than those produced in Comparative Examples 1 to 3 in which any polyfunctional monomer was not used.

EXAMPLE 2 TO 5 AND COMPARATIVE EXAMPLE 4

In the same manner as in Comparative Example 2 but using a monomeric mixture having a composition shown in Table 2, the reaction was carried out to obtain a polymer. The tensile properties of the polymer were measured in the same manner as in Example 1. The results are shown in Table 2, wherein a unit of the amounts of the compounds is gram.

TABLE 3

|  | Example No. |  |  |  | Comparative Example 4 |
|---|---|---|---|---|---|
|  | 2 | 3 | 4 | 5 |  |
| Monomeric mixture |  |  |  |  |  |
| n-Butyl acrylate | 94.2 | 93.8 | 94.6 | 95.4 | 60.0 |
| γ-Mercaptopropyldimethoxysilane | 2.3 | 2.3 | 2.3 | 2.3 | 2.3 |
| Aronix M 1600*[1] | 3.0 | — | — | — | — |
| PEG 400 DA*[2] | — | 3.4 | — | — | — |
| Trimethylolpropane triacylate | — | — | 2.6 | — | 37.2 |
| Tris(2-hydroxyethyl)isocyanuric acid triacrylate | — | — | — | 1.8 | — |
| AIBN | 0.5 | 0.5 | 0.5 | 0.5 | 0.5 |
| Viscosity (poise, 23° C.) | 400 | 500 | 510 | 400 | Gelled |
| $M_{150}$ (kg/cm$^2$) | 2.6 | 3.0 | 3.0 | 2.8 |  |
| $T_B$ (kg/cm$^2$) | 5.6 | 5.7 | 5.4 | 5.8 |  |
| $E_B$ (%) | 500 | 520 | 480 | 540 |  |
| Failure |  |  | Cohesive failure |  |  |

Note*[1] Bifunctional acrylate (manufactured by Toa Gosei Kagaku)

*[2] $CH_2=CHCO-(CH_2CH_2O)_8-CH_2CH_2OCCH=CH_2$ (manufactured by Nippon Kayaku)

(with two C=O groups as shown)

As is seen from the results of Table 2, trifunctional monomer is also preferably used according to the present invention. In Comparative Example 4 in which the polyfunctional monomer was used in an amount outside the present invention, the polymer was gelled in the course of the polymerization.

EXAMPLES 6 TO 10

In the same manner as in Comparative Example 2 but using a monomeric mixture having a composition shown in Table 3, the reaction was carried out to obtain a polymer. The tensile properties of the polymer were measured in the same manner as in Example 1. The results are shown in Table 3.

TABLE 3

|  | Example No. |  |  |  |  |
|---|---|---|---|---|---|
|  | 6 | 7 | 8 | 9 | 10 |
| Monomeric mixture |  |  |  |  |  |
| n-Butyl acrylate | 93.3 | 46.7 | — | 73.3 | — |
| 2-Ethylhexyl acrylate | — | 46.6 | 93.3 | — | 92.8 |
| Ethyl acrylate | — | — | — | 20.0 | — |
| γ-Methacryloxypropyldimethoxysilane | — | — | — | — | 0.5 |
| γ-Mercaptopropyldimethoxysilane | 3.5 | 3.5 | 3.5 | 3.5 | 3.5 |
| Tris(2-hydroxyethyl)-isocyanurate triacrylate | 2.7 | 2.7 | 2.7 | 2.7 | 2.7 |
| AIBN | 0.5 | 0.5 | 0.5 | 0.5 | 0.5 |
| Viscosity (poise, 23° C.) | 270 | 260 | 240 | 300 | 240 |
| $M_{150}$ (kg/cm$^2$) | 3.0 | 2.8 | 2.5 | 3.1 | 3.5 |
| $T_B$ (kg/cm$^2$) | 6.4 | 6.2 | 6.1 | 6.5 | 6.0 |
| $E_B$ (%) | 520 | 560 | 550 | 540 | 480 |
| Failure |  |  | Cohesive failure |  |  |

EXAMPLES 11 TO 15

In the same manner as in Comparative Example 2 but using a monomeric mixture having a composition shown in Table 4, the reaction was carried out to obtain a polymer. The tensile properties of the polymer were measured in the same manner as in Example 1. The results are shown in Table 4.

TABLE 4

|  | Example No. |  |  |  |  |
|---|---|---|---|---|---|
|  | 11 | 12 | 13 | 14 | 15 |
| Monomeric mixture |  |  |  |  |  |
| n-Butyl acrylate | 93.2 | 92.7 | 93.2 | 91.2 | 91.2 |
| γ-Mercaptopropyldimethoxysilane | 3.5 | — | 3.5 | — | 1.5 |
| Neopentylglycol diacrylate | 2.8 | 2.8 | 2.8 | 2.8 | 2.8 |
| AIBN | 0.5 | — | — | — | — |
| Azo compound initiator*[1] | — | 4.5 | — | — | 4.5 |
| Benzoyl peroxide | — | — | 0.5 | — | — |
| Peroxide compound initiator*[2] | — | — | — | 5.5 | — |
| Viscosity (poise, 23° C.) | 290 | 490 | 260 | 350 | 250 |
| $M_{150}$ (kg/cm$^2$) | 2.9 | 2.6 | 2.9 | 2.7 | 3.4 |
| $T_B$ (kg/cm$^2$) | 6.1 | 5.7 | 6.0 | 5.9 | 6.2 |
| $E_B$ (%) | 500 | 470 | 520 | 490 | 450 |
| Failure |  |  | Cohesive failure |  |  |

Note*[1] $\left[ (CH_3O)_2Si(CH_2)_4\underset{\underset{CN}{|}}{\overset{\overset{CH_3}{|}}{C}}-\underset{}{N=} \right]_2$ (with CH$_3$ on Si)

*[2] $(CH_3O)_2Si(CH_2)_3OCOOC(CH_3)_3$ with CH$_3$ and O substituents

As is seen from the results of Table 4, the radical initiator having the reactive silicone group is preferably used in combination with the polyfunctional monomer. In addition, a combination of the radical initiator and the chain transfer agent having the reactive silicone group is preferred.

EXAMPLE 16

In the same manner as in Example 1 but using a propyleneoxide polymer having terminal groups 80% of which are $(CH_3O)_2Si(CH_3)CH_2CH_2CH_2O-$ (average molecular weight, 12,000) in place of that having the average molecular weight of 8,200, the reaction was carried out to obtain a transparent pale yellow viscous liquid polymer with viscosity of 350 poise (23° C.). GC analysis revealed that the amount of the residual monomer was 0.4%.

In the same manner as in Example 1, tensile properties were measured. $M_{150}=2.9$ kg/cm$^2$. $T_B=5.7$ kg/cm$^2$. $E_B=580\%$.

COMPARATIVE EXAMPLE 5

A monomeric mixture (100 g) having the same composition as used in Example 5 was prepared. 30 g of the mixture was charged in a reactor which had been replaced with nitrogen, and heated to 90° C. in a nitrogen atmosphere. Within 10 to 20 minutes, heat was generated and the viscosity of the system increased. After the system was stabilized, the remainder of the monomeric mixture (70 g) was dropwise added to the reactor over 2 hours. AIBN (each 0.25 g) dissolved in 4 time volume of acetone was added after 15 and 30 minutes from the completion of the addition of the mixtrue. Thereafter, the reaction was continued for further 30 minutes with stirring to obtain a transparent viscous liquid polymer with viscosity of 990 poise (23° C.). GC analysis revealed that the amount of the residual monomer was 0.9%.

The thus produced polymer was thoroughly mixed with a propyleneoxide polymer having terminal groups 80% of which are $(CH_3O)_2Si(CH_3)CH_2CH_2CH_2O-$ (average molecular weight, 8,200) in a weight ratio of 2:1, 1:1 or 1:2 by means of a spatula. However, the polymer system was semi-transparent and separated into two layers after kept standing for one week.

On the contrary, the polymer produced in Example 5 was transparent and did not separate after kept standing.

EXAMPLE 17

To the polymer (100 g) produced in Example 4, dioctyl phthalate (20 g), a benzotriazol type ultoraviolet light absorbing agent (1 g), a hindered amine type light stabilizer (1 g), dibutyltin laurate (2 g) and laurylamine (0.5 g) were added and thoroughly mixed. After degassing, a sheet of about 3 mm in thickness was formed from the mixture and aged at 20° C., 50 %RH for 3 days and then at 50° C. for 3 days to obtain a cured sheet. The cured sheet was set in a sunshine weatherometer (manufactured by Suga Shikenki Kabushikikaisha) to evaluate weather resistance of the surface.

The cured product showed no change after 1,000 hours, while a cured sheet prepared from the propyleneoxide polymer having terminal groups 80% of which are $(CH_3O)_2Si-(CH_3)CH_2CH_2CH_2O-$ (average molecular weight, 8,200) generated hair cracks on the surface after 500 hours.

What is claimed is:

1. A polymer which is prepared by addition polymerizing at least one ethylenically unsaturated monomer in the presence of:
   (A) an organic polymer having, in a molecule, at least one reactive silicone group of the formula:

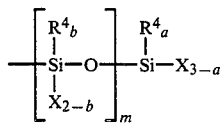
(I)

wherein $R^4$ is a $C_1-C_{20}$ alkyl group, a $C_6-C_{20}$ aryl, a $C_7-C_{20}$ aralkyl group or a triorganosiloxane group of the formula:

$(R'')_3SiO-$ in which $R''$ is, the same or differant, $C_1-C_{20}$ hydrocarbon group, X is a hydroxyl group or, the same or different, a hydrolyzable group, a is an integer of 0 to 3, b is 0, 1 or 2 and m is an integer of 1 to 18, said polymer being selected from the group consisting of a polyalkyleneoxide, a polyester and an ether-ester block copolymer,
   (B) a compound having at least two independent ethylenically unsaturated group in a molecule, and
   (C) at least one component selected from the group consisting of a radical polymerization initiator having a reactive silicone group (I), a chain transfer agent having a reactive silicone group (I) and a mixture thereof.

2. A polymer according to claim 1, wherein the polymer is prepared by addition polymerizing 100 parts by weight of the ethylenically unsaturated monomer in the presence of:
   (A) 10 to 1,000 parts by weight of the organic polymer having the reactive silicone group,
   (B) 0.5 to 50 parts by weight of the compound having at least two independent ethylenically unsaturated groups, and
   (C) 0.01 to 20 parts by weight of the component selected from the group consisting of a radical polymerization initiator having a reactive silicone group (I), a chain transfer agent having a reactive silicone group (I) and a mixture thereof.

3. A polymer according to claim 1, wherein the organic polymer is a polyalkyleneoxide having a main chain comprising repeating units of the formula:

(VII)

wherein $R^1$ is a $C_1-C_8$ divalent hydrocarbon group.

4. A polymer according to claim 3, wherein the organic polymer has at least one reactive terminal silicone group and a molecular weight of 3,000 to 15,000.

5. A polymer according to claim 1, wherein the ethylenically unsaturated monomer is at least one monomer selected from the group consisting of an ethylenically unsaturated compound of the formula:

(VIII)

wherein $R^2$ is a hydrogen atom, a halogen atom or a substituted or unsubstituted $C_1-C_{10}$ monovalent hydrocarbon group, and $R_3$ is a hydrogen atom, a halogen atom, a substituted or unsubstituted $C_1-C_{10}$ monovalent hydrocarbon group, a substituted or unsubstituted monovalent aromatic group, an alkenyl group, a carboxyl group, an acyloxy group, an alkoxycarbonyl group, a nitrile group, a pyridyl group, an amide group or a glycidoxy group, and an ethylenically unsaturated compound of the formula:

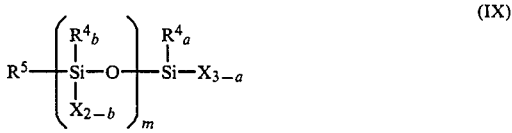
(IX)

wherein $R_4$, X, a, b and m are the same as defined above, and $R_5$ is an organic group having an ethylenically unsaturated group.

6. A polymer according to claim 5, wherein the ethylenically unsaturated compound (VIII) is an acrylate or methacrylate monomer of the formula:

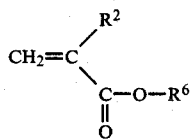 (X)

wherein $R^2$ is the same as defined above and $R^6$ is a substituted or unsubstituted $C_1$-$C_{20}$ monovalent aliphatic or aromatic group.

7. A polymer according to claim 1, wherein the radical initiator having the reactive silicone group is an azo or peroxide compound.

8. A polymer according to claim 1, wherein the chain transfer agent having the reactive silicone group is at least one compound of the formulas:

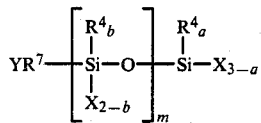 (XII)

and

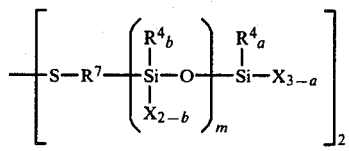 (XIII)

wherein $R^4$, X, a, b and m are the same as defined above, and $R^7$ is a $C_1$-$C_{20}$ divalent saturated hydrocarbon group and Y is a group which imparts a chain transfer constant larger than $10^{-3}$ to the compound (XII) and is to be activated by a free radical.

9. A polymer according to claim 1, wherein the hydrolyzable group X is a group selected from the group consisting of a halogen atom, a hydride group, an alkoxy group, an acyloxy group, a ketoximate group, a mercapto group and an alkenyloxy group.

10. A polymer according to claim 1, wherein the hydrolyzable group X is an alkoxy group.

11. A polymer according to claim 8, wherein the chain transfer agent is one having a mercapto group.

12. A composition comprising a polymer according to claim 1.

13. A cured product of the polymer according to claim 1.

* * * * *